(12) United States Patent
Hay et al.

(10) Patent No.: US 7,824,747 B2
(45) Date of Patent: Nov. 2, 2010

(54) DIFFUSER FOR FLAT PANEL DISPLAY

(75) Inventors: Grant Hay, Evansville, IN (US); Kevin P. Capaldo, Mt. Vernon, IN (US); Gheorghe Cojocariu, Evansville, IN (US); Karkala Arun Kumar, Evansville, IN (US); Theodorus Lambertus Hoeks, Bergen op Zoom (NL); Todd M. Loehr, Evansville, IN (US); John F. Graf, Ballston Lake, NY (US); Nathan D. Hoffman, Evansville, IN (US); Scott Leslie, Lanesboro, MA (US); Anshu Ghosal, New Delhi (IN); Philippe Schottland, Evansville, IN (US)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 395 days.

(21) Appl. No.: 12/003,572

(22) Filed: Dec. 28, 2007

(65) Prior Publication Data
US 2008/0131625 A1    Jun. 5, 2008

Related U.S. Application Data

(62) Division of application No. 10/787,158, filed on Feb. 27, 2004, now Pat. No. 7,314,652.

(60) Provisional application No. 60/451,342, filed on Feb. 28, 2003.

(51) Int. Cl.
    *G02F 1/335* (2006.01)
(52) U.S. Cl. .................. 428/1.51; 428/1.1; 362/607

(58) Field of Classification Search .............. 362/607, 362/557, 600; 524/165, 912; 428/1.1, 1.51
See application file for complete search history.

(56) References Cited

U.S. PATENT DOCUMENTS

| 6,194,497 B1 | 2/2001 | Willems et al. |
| 6,649,271 B2 * | 11/2003 | Taruishi ................ 428/447 |
| 6,908,202 B2 | 6/2005 | Graf et al. |
| 7,314,652 B2 * | 1/2008 | Hay et al. ................ 428/1.1 |

(Continued)

FOREIGN PATENT DOCUMENTS

EP         0 615 996 A1     9/1994

(Continued)

OTHER PUBLICATIONS

PCT International Search Report dated Sep. 23, 2005.

*Primary Examiner*—Anabel M Ton
(74) *Attorney, Agent, or Firm*—Foley & Lardner LLP

(57) ABSTRACT

A light diffusing film for a back light display is described. The light diffusing film includes a unitary film consisting essentially of polycarbonate and a uniformly dispersed anti-static material in an amount sufficient to impart anti-static properties to the film. The anti-static material may comprise a fluorinated phosphonium sulfonate. The film may additionally include at least one textured surface for the low scattering of light. Alternatively, the film may additionally include a uniformly dispersed acrylic bulk scattering additive of particles having a mean particle size of from about 3 to about 10 microns and present in an amount from about 2 to about 7 percent by weight percent for the high scattering of light.

7 Claims, 8 Drawing Sheets

U.S. PATENT DOCUMENTS

| | | |
|---|---|---|
| 2003/0156238 A1 | 8/2003 | Hiraishi et al. |
| 2003/0174396 A1 | 9/2003 | Murayama et al. |
| 2003/0214728 A1 | 11/2003 | Olczak |
| 2004/0066645 A1 | 4/2004 | Graf et al. |
| 2006/0114569 A1 | 6/2006 | Capaldo et al. |
| 2006/0263545 A1* | 11/2006 | Coenjarts et al. ............. 428/1.3 |

FOREIGN PATENT DOCUMENTS

| | | |
|---|---|---|
| EP | 1 089 114 A2 | 4/2001 |
| EP | 1 199 325 A1 | 4/2002 |
| EP | 1 329 746 A1 | 7/2003 |
| EP | 1 361 242 A1 | 11/2003 |
| EP | 0 897 950 B1 | 4/2004 |
| JP | 60-184559 A | 9/1985 |

\* cited by examiner

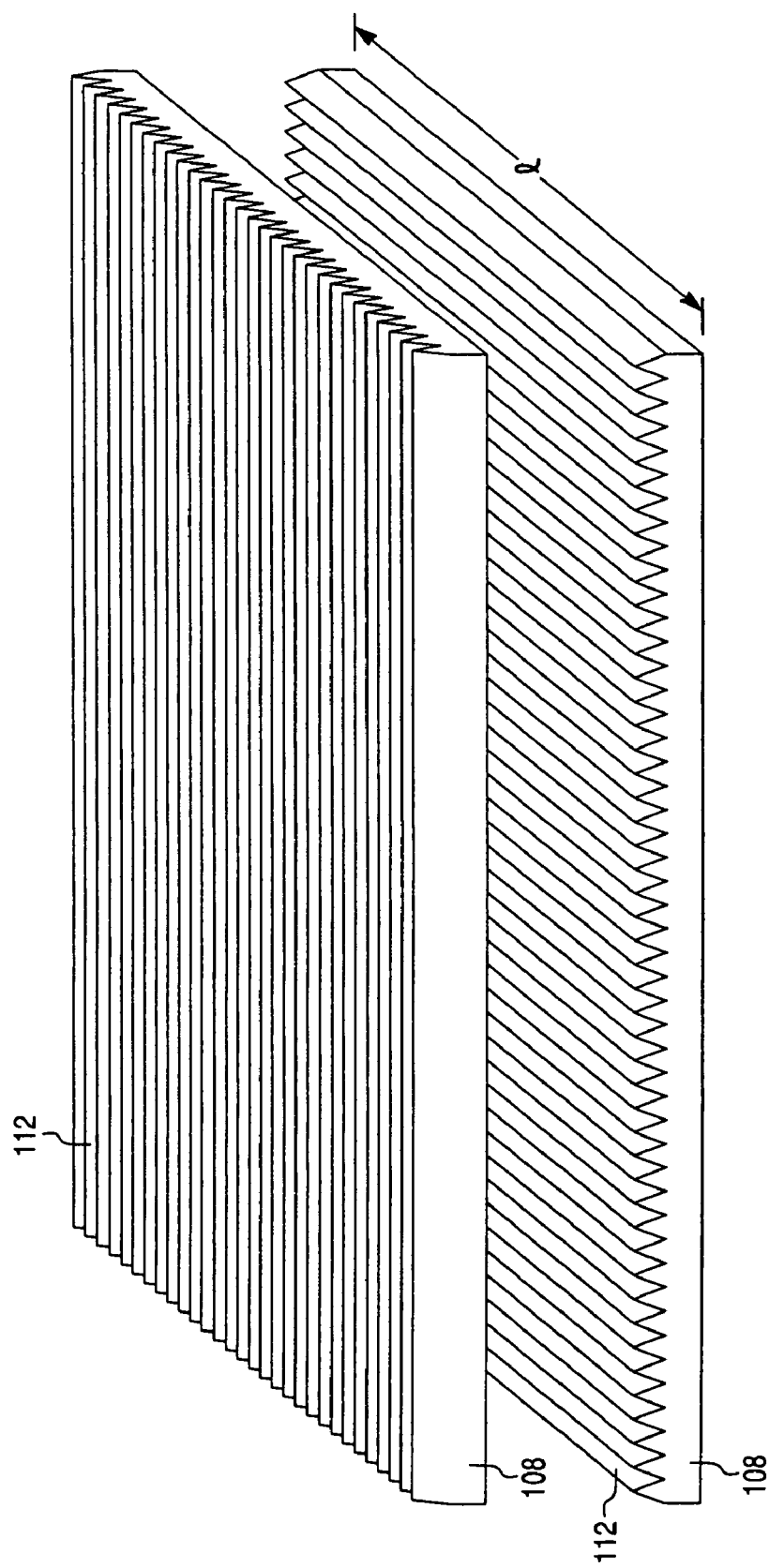

Masking Peel Test Capability (OZ/in)

Retardation Capability (nm)

No. Point Defects Between 0.1 and 0.15min Capability

No. Black Spot Point Defects > 0.15mm Capability

DIFFUSER FOR FLAT PANEL DISPLAY

RELATED APPLICATIONS

This application is a divisional application of U.S. application Ser. No. 10/787,158, filed on Feb. 27, 2004, which claims priority from U.S. provisional Application No. 60/451,342 filed on Feb. 28, 2003, the entire contents of which are incorporated by reference.

BACKGROUND OF THE INVENTION

This invention relates to optical sheet material and, more specifically, to such sheet material characterized by light diffusion properties. This invention also relates to back light displaying using the optical sheet, and to processes for making the sheet material.

In many current displays systems, for example in Liquid Crystal Displays (LCD), it is desirable to have diffusing components. Examples of the utility of diffusing components include (but are not limited to) masking artifacts, such as seeing electronic components located behind the diffuser film and/or hiding injection molded patterns or printing on the light guide pipe of the display, improved uniformity in illumination and increased viewing angle. In a typical LCD display, diffusion of light is introduced into the backlight assembly by adding separate films (i.e., a stack) that are comprised of a non-diffusing substrate to which a highly irregular, diffusing surface treatment is applied or attached. It is thus desirable to generate diffuse light without the added cost of separate films.

In backlight computer displays or other display systems, optical films or sheet material are commonly used to direct, diffuse or polarize light. For example, in backlight displays, brightness enhancement films (BEFs) use prismatic structures on the surfaces thereof to direct light along a viewing axis (i.e., an axis normal to the display). This enhances the brightness of the light viewed by the user of the display and allows the system to consume less power in creating a desired level of on-axis illumination. Such films can also be used in a wide range of other optical designs, such as in projection displays, traffic signals, and illuminated signs.

In current displays systems, for example in Liquid Crystal Displays (LCD), it is desirable to have diffusing components. Examples of the utility of diffusing components include (but are not limited to) masking artifacts, such as seeing electronic components located behind the diffuser film and/or hiding injection molded patterns or printing on the light guide pipe, improved uniformity in illumination and increased viewing angle. In a typical LCD display, diffusion of light is introduced into the backlight assembly by adding separate films (i.e., a stack) that are comprised of a non-diffusing substrate to which a highly irregular, diffusing surface treatment is applied or attached. It is thus desirable to generate diffuse light without the added cost of separate films.

Some of undesirable features of diffuser films are a lack of dimensional stability during high temperature and humidity testing due to mismatched material properties between the substrate and coating, coating defects due to lack of coating process robustness, defect generation during material conversion due to scratches in the coatings, impressions or texture non-uniformities due to tooling and/or web handling rollers, dust attraction and film stickage due to static charge creation, and reduced luminance and luminance uniformity. The first four of the above undesirable features may reduce the yield during the various cutting and assembly processes. It is desirable that diffusers minimize the above undesirable features while enhancing the desirable features of high brightness and brightness uniformity.

SUMMARY OF THE INVENTION

An embodiment of the invention features a light diffusing film with a low scattering power hereinafter referred to as a top diffuser film or a light diffusing film with a high scattering power hereafter referred to as a bottom diffuser film. Desirably both films are unitary or monolithic films characterized by the absence of coatings and include a uniformly dispersed anti-static material comprising a fluorinated phosphonium sulfonate in an amount sufficient to impart anti-static properties to the film. The films may also contain at least one UV stabilizer to prevent discoloration due to the short wavelength light coming out of the light source. The top diffuser film consists essentially of polycarbonate material and the anti-static material and has a texture on at least one surface thereof for obtaining a low scattering of light. The bottom diffuser film consists essentially of polycarbonate, the anti-static material, possibly a UV stabilizer, and a uniformly dispersed acrylic bulk scattering additive having a particle size of from about 3 to about 10 microns in an amount from about 2 to about 7 percent by weight percent for the high scattering of light.

In another aspect of the invention, a backlight display device comprises an optical source for generating light; a light guide for guiding the light therealong including a reflective surface for reflecting the light out of the light guide; and an arrangement of optical films including at least one of a top or bottom diffuser film as set forth above. A preferred device utilizes both the top and bottom diffuser film.

In another aspect of the invention, a light diffusing film for a back light display is provided. The film comprises: a unitary film consisting essentially of polycarbonate and a uniformly dispersed anti-static material in an amount sufficient to impart anti-static properties to the film.

In another aspect of the invention, an assembly for an optical film is provided. The film comprises: the light diffusion film described above, a backing film; and a pressure sensitive adhesive adhering the backing film to the light diffusion film.

In another aspect of the invention there is provided a process for making a light diffusing film. The process comprises: texturing a calendaring roll to form a textured calendaring roll; and using the textured calendaring roll to form the light diffusing film described above.

In another aspect of the invention there is provided a process for making a light diffusing film. The process comprises: using a polymeric coated melt calendaring roll to form the light diffusing film described above.

In another aspect of the invention there is provided process for making a light diffusing film. The process comprises: forming an assembly comprising the light diffusion film described above, a backing film, and a pressure sensitive adhesive adhering the backing film to the light diffusion film; and removing the backing film from the light diffusion film.

In another aspect of the invention there is provided a light diffusing film for a back light display. The film comprises: a unitary film consisting essentially of polycarbonate and a uniformly dispersed anti-static material comprising a fluorinated phosphonium sulfonate in an amount sufficient to impart anti-static properties to the film, said film additionally comprising at least one textured surface for the low scattering of light, or said film additionally comprising a uniformly dispersed acrylic bulk scattering additive of particles having a mean particle size of from about 3 to about 10 microns and present in an amount from about 2 to about 7 percent by weight percent for the high scattering of light.

In another aspect of the invention there is provided a backlight display device. The backlight display device comprises: an optical source for generating light; a light guide for guiding the light therealong; a unitary film consisting essentially of polycarbonate and a uniformly dispersed anti-static material in an amount sufficient to impart anti-static properties to the film.

In another aspect of the invention there is provided a backlight display device. The backlight display device comprises: an optical source for generating light; a light guide for guiding the light therealong; a unitary film consisting essentially of polycarbonate and a uniformly dispersed anti-static material comprising a fluorinated phosphonium sulfonate in an amount sufficient to impart anti-static properties to the film, said film additionally comprising at least one textured surface for the low scattering of light, or said film additionally comprising a uniformly dispersed acrylic bulk scattering additive of particles having a particle size of from about 3 to about 10 microns in an amount from about 2 to about 7 percent by weight percent for the high scattering of light.

In another aspect of the invention there is provided a light diffusing film for a back light display. The film comprises: a unitary film consisting essentially of polycarbonate and a uniformly dispersed anti-static material comprising a fluorinated phosphonium sulfonate in an amount sufficient to impart anti-static properties to the film, the surface resistivity of the film being below about $10^{15}$ ohm/square.

In another aspect of the invention there is provided a light diffusing film for a back light display. The film comprises: a unitary film consisting essentially of polycarbonate and a uniformly dispersed anti-static material in an amount sufficient to impart anti-static properties to the film, the unitary film being substantially transparent.

In another aspect of the invention there is provided a process for making a light diffusing film comprising polycarbonate. The process comprises: passing a polymer resin comprising polycarbonate through a 70 micron or less melt filter of porous disks to provide filtered resin; forming pellets from the filtered resin; melting and extruding the pellets to form an extruded melt; and passing the extruded melt through a gap between two calendaring rolls to form the light diffusing film.

In another aspect of the invention there is provided a process for making a light diffusing film comprising polycarbonate. The process comprises: melting and extruding the polymer resin comprising polycarbonate to form an extruded melt; and passing the extruded melt through a gap between two calendaring rolls to form the light diffusing film having a thickness of at least about 0.008 inches, and wherein the light diffusing film does not exhibit any visible waving when viewed at any angle.

In another aspect of the invention there is provided a process for making a light diffusing film comprising polycarbonate. The process comprises: melting and extruding the polymer resin comprising polycarbonate to form an extruded melt; and passing the extruded melt through a gap between two calendaring rolls to form a web of light diffusing film, a web oscillation speed and a web winding tension being sufficient such that the light diffusing film exhibits no visual gauge bands.

In another aspect of the invention there is provided a light diffusing film. The film comprises: a polycarbonate material; and an ultraviolet absorber (UVA) component in an effective amount to reduce discoloration of the film when exposed to ultraviolet (UV) light, wherein the color shift of the film after 200 hours of accelerated weathering according to the ASTM D4674 method 3 is dx<0.0005 and dy<0.0005, where dx is the shift in the x chromaticity coordinate and dy is the shift in the y chromaticity coordinate according to CIE 1931, and wherein the color shift is measured in reflectance mode using a D65 illuminant and an observer angle of 10°.

In another aspect of the invention there is provided a light diffusing film. The film comprises: a polycarbonate material; and an ultraviolet absorber (UVA) component in an effective amount to reduce discoloration of the film when exposed to ultraviolet (UV) light, wherein the color shift after 50,000 hours operational use in a single lamp LCD is dx<0.0005 and dy<0.0005, where dx is the shift in the x chromaticity coordinate and dy is the shift in the y chromaticity coordinate according to CIE 1931.

In another aspect of the invention there is provided a light diffusing film. The film comprises: a polycarbonate material, wherein the light diffusing film has a weight loss per surface area for a Taber test of less than about $4.0 \times 10^{-5}$ gms/cm².

BRIEF DESCRIPTION OF THE DRAWINGS

FIG. 4 is a perspective view of two optical substrates with prismatic surfaces with direction of the prismatic features oriented at an angle with respect to each other.

DETAILED DESCRIPTION OF THE INVENTION

Liquid Crystal Flat Panel displays require some form of light source to function. Typically, the largest part of the flat panel market today is back-lit. Typically, the backlighting module (BLM) of an LCD display is made up of a combination of a housing, an acrylic light pipe placed at the edge of the light pipe, a reflective film at the back of the light pipe and some optical films placed on top.

Figure 2:
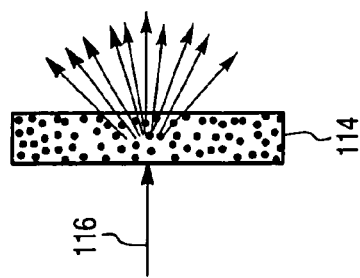
FIG. 2 is a cross sectional view of a light diffusing film receptive of light and diffusing the light emanating therefrom according to an embodiment of the invention.
Figure 1:
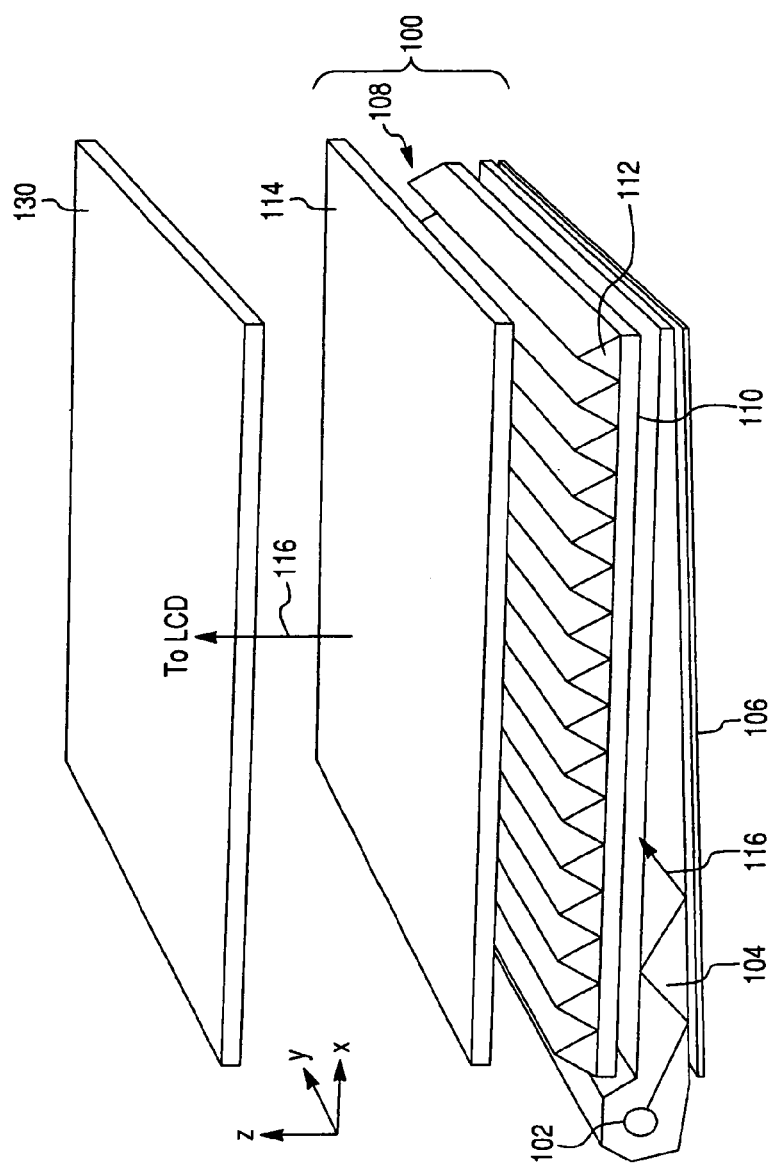
FIG. 1 is a perspective view of a backlight display device including a light diffusing film according to an embodiment of the invention.

FIG. 1 illustrates a perspective view of a backlight display device 100 according to an embodiment of the invention. The backlight display device 100 comprises an optical source 102 for generating light 116. A light guide 104 guides the light 116 therealong by total internal reflection. A reflective device 106 positioned along the light guide 104 reflects the light 116 out of the light guide 104. A BEF optical substrate 108 positioned above the light guide 104 is receptive of the light 116 from the light guide 104. The BEF 108 comprises, on one side thereof, a planar surface 110 and on a second, opposing side thereof, a prismatic surface 112. The BEF 108 is receptive of the light 116 and acts to direct the light 116 in a direction that is substantially normal to the BED optical substrate 108 along a direction z as shown. The light 116 is then directed to a diffuser optical substrate 114 located above the BED substrate 108 to provide diffusion of the light 116. The diffuser optical substrate 114 is receptive of the light 116 from the BED optical substrate 108. The light 116 proceeds from the diffuser optical substrate 114 to a liquid crystal display (LCD) 130. FIG. 2 illustrates light 116 impinging upon the diffuser optical substrate 114 and being scattered thereby.

Figure 3:
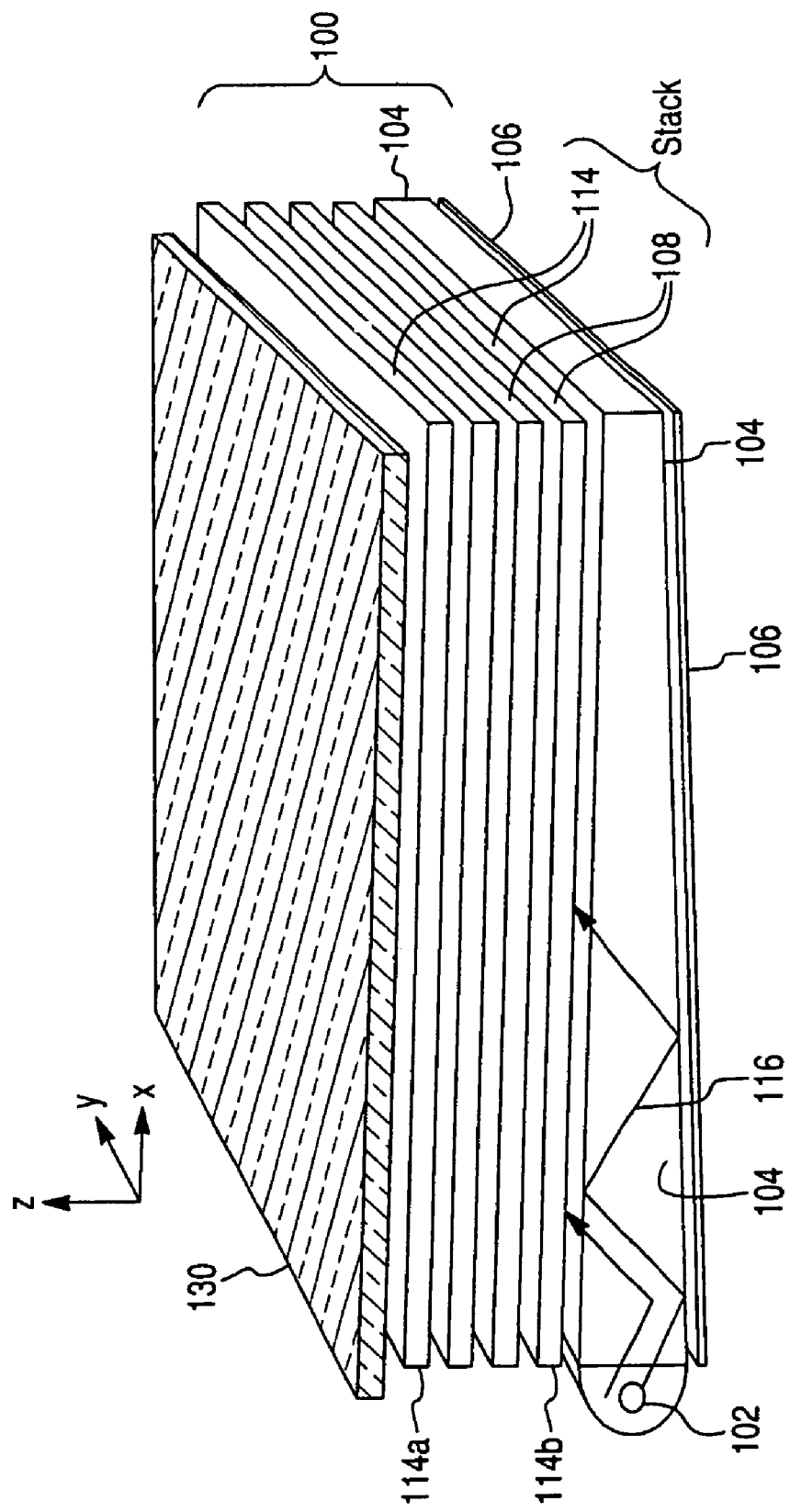
FIG. 3 is a perspective view of a backlight display device including a stack of optical substrates including one or more light diffusing films according to an embodiment of the invention.
Figure 5A:
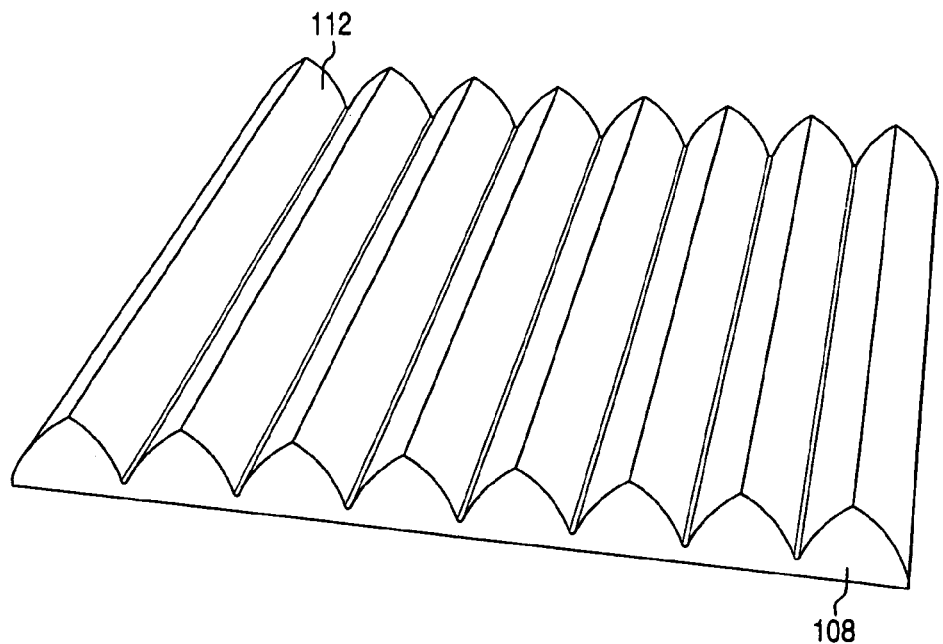
FIGS. 5A and 5B are a perspective view and cross sectional view, respectively, of an optical substrate with prismatic surfaces.
Figure 5B:
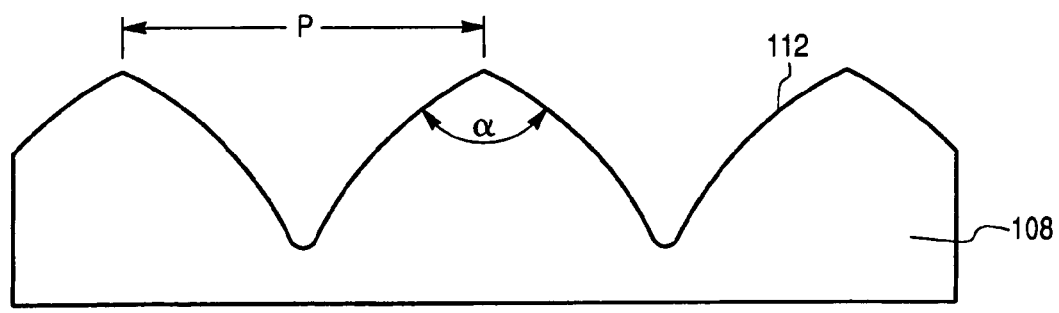

As illustrated in FIG. 3, the backlight display device 100 may include a plurality of optical substrates 108, 114 arranged in a stack as shown. Furthermore, the prismatic surfaces 112 of the substrates 108 may be oriented such that the direction of the features of the prismatic surfaces 112 are positioned at an angle with respect to one another, e.g., 90 degrees (see FIG. 4). Still further, it will be appreciated that the prismatic surfaces 112 may have a peak angle, $\alpha$, a height, h, a pitch, p, and a length, l (see FIGS. 5A and 5B). These parameters of peak angle, $\alpha$, a height, h, a pitch, p, and a length, l may have prescribed values or may have values which are randomized or at least psuedo-randomized. Films with prismatic surfaces with randomized or pseudo-randomized parameters are described for example in U.S. application Ser. No. 10/150,958 to Olcazk filed on May 20, 2002, which is hereby incorporated by reference herein.

Returning to FIG. 3, typical computer notebook configurations utilize a light source 102, i.e. such as a cold cathode florescent light (CCFL), an adjacent reflector 106 and a light guide 104 of LG Pipe, for example, adjacent the reflector 106, moving along the direction of light travel. Typically, the configuration includes a diffuser 114b adjacent the light guide 104, in which diffuser 114b is referred to in this specification as the bottom diffuser. Various configurations may be utilized with additional optical films being adjacent the bottom diffuser. These films typically include BEF type configurations known in the art as BEF, BEF-T, BEF-M, and DBEF-D. In addition to these films, the notebook configuration may include a diffuser film 114a known as a top diffuser film, where the BEFs 108 are located between the top and bottom diffuser films 114a, 114b.

As previously set forth, desirably both diffusion films include a uniformly dispersed anti-static material comprising a fluorinated phosphonium sulfonate in an amount sufficient to impart anti-static properties to the film. The anti-static material is described in U.S. Pat. No. 6,194,497 to Henricus et al. which description is incorporated by reference into the present specification. The phosphonium sulfonate is preferably a fluorinated phosphonium sulfonate and is composed of a fluorocarbon containing an organic sulfonate anion and an organic phosphonium cation. Examples of such organic sulfonate anions include perfluoro methane sulfonate, perfluoro butane sulfonate, perfluoro hexane sulfonate, perfluoro heptane sulfonate and perfluoro octane sulfonate. Examples of the aforementioned phosphonium cation include aliphatic phosphonium such as tetramethyl phosphonium, tetraethyl phosphonium, tetrabutyl phosphonium, triethylmethyl phosphonium, tributylmethyl phosphonium, tributylethyl phosphonium, trioctylmethyl phosphonium, trimethylbutyl phosphonium trimethyloctyl phosphonium, trimethyllauryl phosphonium, trimethylstearyl phosphonium, triethyloctyl phosphonium and aromatic phosphoniums such as tetraphenyl phosphonium, triphenylmethyl phosphonium, triphenylbenzyl phosphonium, tributylbenzyl phosphonium.

The preferred fluorinated phosphonium sulfonate can be obtained by any combination of any of these organic sulfonate anions and organic cations. Fluorinated phosphonium sulfonate may be produced in a very pure form by mixing the corresponding sulfonic acid and the quarternary phosphonium hydroxide in a solvent mixture followed by evaporation of the solvent mixture. Tetrabutyl phosphonium perfluoro butane sulfonate, for example, can be produced with a yield of about 95% by placing 98.6 g. of perfluoro butane sulfonic acid, 200 ml. of a 40 wt. % solution of tetrabutyl phosphonium hydroxide and a 500 ml of a solvent mixture in a flask, stirring the mixture for one hour at room temperature, isolating phosphonium sulfonate which separates as an oily layer, washing it with 100 ml of water, followed by evaporation of the solvents using a vacuum pump.

The preferred phosphonium sulfonate employed herein is a fluorinated phosphonium sulfonate having the general formula: $\{CF3(CF2)n(SO3)\}\theta$ $\{P(R1)(R2)(R3)(R4)\}\Phi$ wherein F is fluorine; n is an integer of from 1-12, S is sulfur; R1, R2 and R3 are the same, each having an aliphatic hydrocarbon radical of 1-8 carbon atoms or an aromatic hydrocarbon radical of 6-12 carbon atoms and R4 is a hydrocarbon radical of 1-18 carbon atoms. Anti-static compositions comprising fluorinated phosphonium sulfonate shown by formula as having the principle component thereof can be used in many different ways to make use of their anti-static and compatibility characteristics and heat resistance in providing such anti-static characteristics to polycarbonate. The phosphonium fluorocarbon sulfonate salts are low melting semi-solid materials, and as such, they can be handled as a molten liquid. Some embodiments are solid crystalline materials at room temperature (15-25° C.) and are easy to weigh, handle, and add to the polycarbonate.

A common way to practice this method is to add the agent directly and to mix it at the time of polymer production or fabrication. It can be processed by conventional means, including extrusion, injection molding, compression molding or casting. The quantity of the phosphonium fluorocarbon sulfonate salt added to polycarbonate is an amount effective to reduce or eliminate a static charge and can be varied over a range. It has been found that if too little of the anti-static substituted phosphonium fluorocarbon sulfonate salt is added to the resin, there still may be a tendency for static charge to build up on the article made of the resin. If the loadings of the anti-static additive become too high, the addition of these quantities is uneconomical, and at some level it may begin adversely to affect other properties of the resin. For example, in order to obtain a favorable result by such an internal application method in transparent polycarbonate grades, it is preferable to add an agent of the present invention at the rate of 0.1-1.5 wt % with respect to the extrusion composition and it is even more preferable to do so at the rate of 0.4-0.9 wt %. The anti-stats described are more strongly resistant against heat and can be added in lower quantities than the conventional ionic surfactants, e.g. phosphonium alkyl sulfonates, and the resin compositions have good transparency and mechanical properties.

Advantageously, the resin composition with the anti-stat may be fully transparent. For example, when the resin composition includes polycarbonate the anti-stat is chosen so that the resulting composition remains transparent. This is in contrast to other anti-stat additives that have a negative impact on transparency. Thus, according to one embodiment of the invention, the diffuser film remains transparent to light while at the same time having good anti-stat performance.

Returning to FIG. 3, predominately the bottom diffuser film's main function is to use the film's diffusion characteristics to enhance the uniformity of the light and interact with the other backlight films to create the greatest on-axis luminance possible. Another function of the bottom diffuser is to hide any optical imperfections generated by the light guide 104. The top diffuser film's main functions are to minimize glare and optical coupling (Newton Rings) between the BEF and polarizers that may be in the LCD 130. In addition the BEF films may have prismatic structures on the surface that have the tendency to fracture during contact with other media. This damage can lead to negatively impacting optical and cosmetic performance. The top diffuser also has the function of acting as a protective film for the BEF films reducing the likelihood of the above mentioned fracture.

BEFs typically modify light propagating at angles larger than angles which are desirable for practical viewing (~30-40° depending on the application) and collimate it towards the viewer. A BEF typically utilizes a very controlled geometrical structure and the principal of total internal reflection to collimate the light effectively.

Backlight modules that are designed for notebook applications may be optimized to maximize the on axis luminance and light usage so that lower powered light sources can be utilized minimizing power consumption and hence increase battery life. This may be accomplished by utilizing two crossed BEF films (See FIG. 4). The bottom diffuser films desirably create a microstructure or surface topology that enhances the collimating power of the film. The balance between on axis brightness and viewing angle performance for the BEF films can be optimized. For Notebook applications the bottom diffuser need not provide a great deal of collimating functionality due to the utilization of cross BEFs, whereas in desktop applications it is common to utilize only a single BEF and hence it is preferable that the bottom diffuser provide enough collimation to meet the on-axis brightness and view angle requirements in combination.

Various techniques may be utilized to refract and scatter light to obtain films with light diffusing power. For example, physical modifications to the films may result in imprinting a texture to the surface of the film to diffuse light. Bulk technologies can be used to imbed component particles into a polymer matrix with the resulting extruded film having light diffusing properties.

Surface coatings may attach component particles attached to the surface of the film to diffuse light. Typically, a bi-axially orientated base polyethylene terephthalate (PET) resin film is coated to deposit particles. Typically acrylic particles on the order of 2-10 microns are mixed in with a binder that is roll coated and UV cured onto the film. Utilizing various binders and particles, films of varying diffusing and collimating power may be manufactured. Typically the top diffuser is a low scattering and collimating power film and the bottom diffuser has high scattering and collimating power.

Figure 8:
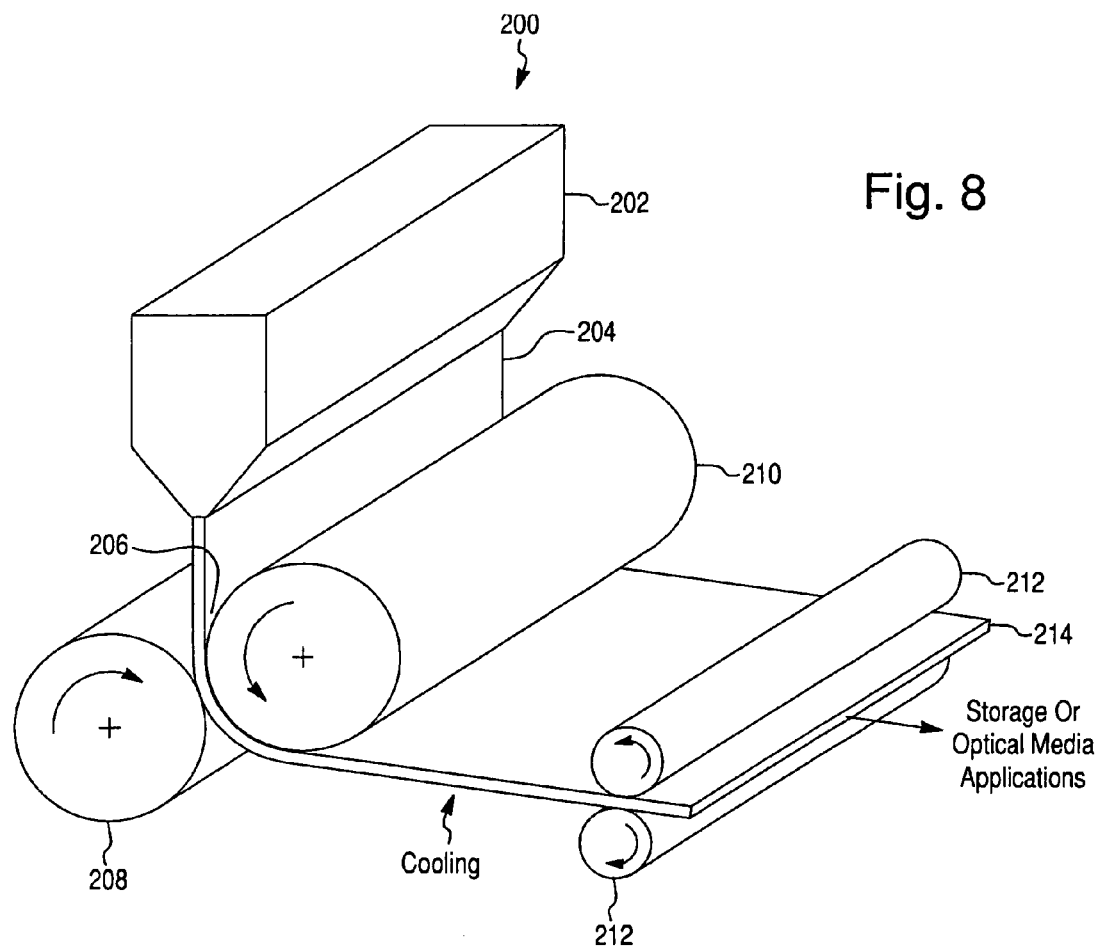
FIG. 8 is a schematic view of a continuous extrusion system illustrating the extrusion of a thermoplastic melt downward into the nip or gap between two calendaring rolls.

FIG. 8 is a schematic illustrating an exemplary calendaring roll system 200 which may used to produce the light diffusing film according to an embodiment of the invention. The system 200 includes an extrusion nozzle 202 through which the light diffusing film material 204 is extruded. The light diffusing film material 204 is heated to a temperature sufficient to melt the material, which temperature is above the glass transition temperature (Tg) of the material. The material 204 as an extruded melt is passed through the nip or gap 206 formed by the calendaring rolls 208 and 210, is cooled and then passed through pull rolls 212. The cooled finished film 214 is the light diffusing film.

One method for manufacturing surface textured diffuser films is through the use of a glass or metal master, where the master is produced by blasting grit onto the surface of the master. The surface topology created from this process in-turn acts to diffuse the light through scattering and refraction. This process may be used to master calendaring rolls that are utilized in the melt calendared production of film. The polymeric melt replicates the structure of the textured surface during the melt calendaring process.

Mastering the textured calendaring rolls typically involves building a high quality cylindrical surface of metal (steel, copper, etc.) or polymeric materials (EPDM, silicone rubber, etc.), which minimizes material impurities and voids. The cylinder face is then ground to a smooth surface and then either bead blasted, electro-discharge textured, or engraved to generate either a random matte texture or an engineered surface texture on the surface. Electroplating of chrome or nickel may then be applied to improve the robustness of the tool. Buffing or dusting may then occur to generate a final random texture surface. These types of rolls are used in paper and plastic film production to define the surfaces of these products.

Use of these textured calendaring rolls may require the use of a polymeric backing roll to press, or nip, the molten polymer against the textured metal roll with sufficient force and duration to allow the molten polymer to flow into the texture of the roll and thus replicate the roll texture onto the film. The composition of this backing roll is important in its performance due to the high temperature and high fatigue conditions of melt calendaring. Typically the backing roll is made of a steel shell coated with a cross-linked silicone rubber compound which includes agents such as iron oxide to improve mechanical properties, thermal stability, and thermal conductivity. The thickness, hardness, and surface texture of the backing roll are important to the film performance in that they are the main factors in controlling the replication of the calendaring roll surface to the film as well as the birefringence and stress of the final film. Excessive birefringence and stress can cause flatness issues either as produced or after thermal cycling as well as color artifact issues and local depolarization effects that can influence the final application luminance.

The diffusion of light occurs when light experiences a change in refractive index. This either occurs at the air-polymer interface for a textured diffuser or in the case of bulk diffusers the change occurs when light passes from the matrix material to the component particle and visa versa.

The type of scattering is dependent on the size of the particle or surface feature. If the particle size is smaller than the wavelength of light, Rayleigh scattering occurs. If the particle is roughly equal to or greater than the wavelength of light, Mie scattering dominates. Mie scattering results in a high percentage of forward transmitted light.

The Mie principle, which describes Mie scattering, is the solution of Maxwell's electromagnetic wave equations with the boundary condition that the particle size is equal to or greater than the wavelength of light. The Mie solution gives the electric and magnetic fields at any point inside or outside the particle. Based on the solution the light intensity values at various angles may be determined, and the transmission and diffusion of light through the media may be determined also.

The present invention produces LCD diffusers by generating specific textures and in some cases combining the textures with bulk scattering additives to the resin that the film is calendared from. The purpose of the bulk optical diffuser film is to allow the forward transmission and diffusion of light. The diffuser is part of the LCD unit, which is used in numerous optical display products such as notebook computer screens, flat-panel desktop monitors, and flat screen TVs.

Suitable light diffusing particles comprise organic materials, or mixtures thereof, and do not significantly adversely affect the physical properties desired in the polycarbonate, for example impact strength or tensile strength. Preferred light diffusing particles are acrylic based and include poly(acrylates); poly(alkyl methacrylates), for example poly(methyl methacrylate) (PMMA) and mixtures comprising at least one of the foregoing organic materials, wherein the alkyl groups have from one to about twelve carbon atoms. PMMA is a preferred material for use as the added light diffusing particles because its addition to the polycarbonate film produces a film with no reduction in the forward transmitted light but enough difference in refractive index to induce single and multiple site scatter to the point where the film will produce a haze in excess of 97%.

Typical films are about 0.025 to 0.5 mm in thickness with a refractive index of about 1.59 but may be thicker or thinner as an application requires. With no light diffusing particles added to the polycarbonate film the integrated reflection is 9.7% and the integrated transmission is 88.4% for one embodiment. The index of refraction of the light diffusing particles ranges from about 1.49 to about 1.43. Lowering the refractive index of the added particulate matter from 1.49 to 1.43 relative to that of polycarbonate film refractive index of 1.59 reduces transmission and increases the reflection of light through the polycarbonate film.

The predicted and measured percent haze is calculated from $$\% \text{Haze} = 100 \times \frac{\text{Total Diffuse Transmission}}{\text{Total Transmission}} \quad (1)$$

where total transmission is the integrated transmission and the diffuse transmission is the light transmission that is scattered by the film as defined by ASTM D 1003. PMMA particles ($\Delta$) show a reasonably good equivalence between the measured and predicted values of percent haze obtained from simulations utilizing solutions to the MIE problem. Exemplary simulations can be found, for example, in U.S. patent application Ser. No. 10/065,319, filed on Oct. 3, 2002, which is incorporated by reference herein.

Preferably the refractive index difference between the polycarbonate film and the PMMA particles is about 0.1, which is optimum for high haze and high transmission values. Preferred polycarbonate compositions containing PMMA particles (both matte and polished film surfaces) show a transmission of greater than 90% and a haze of greater than 80% by controlling the particle concentration. PMMA polished particles typically have a transmittance of about 91% and a haze of about 15%. The aforesaid matte and polished surfaces are defined by gloss values according to ASTM standard D523 where the polished surface has a gloss value of over 90 and a matte surface has a gloss value of under 50.

PMMA particles (with both matte and polished surfaces) suspended in a polycarbonate film at a selected particle concentration and a mean particle size from about 3 to about 10 micrometers are a preferred way of effecting the necessary light diffusion properties in display devices.

Based upon the foregoing description a bulk light diffuser as a polycarbonate film or optical sheet material or optical substrate has been described comprising about 95 to about 99.8 percent by weight of a polycarbonate and about 0.4 to about 2.0 percent by weight anti-stat material in the case of the top diffuser film and comprising about 93 to about 96 percent by weight of a polycarbonate, about 0.4 to about 2.0 percent by weight anti-stat material, and about 2 to about 7 weight percent of bulk scattering additive in the case of the bottom diffuser film. Weight of light diffusing particles and additives are based on the total weight of the polycarbonate, light diffusing particles, and other ingredients. Other components may be present in the polycarbonate compositions in minor amounts, as long as such components do not adversely affect the physical properties of the composition, such that the bulk light diffuser consists essentially of the polycarbonate and the light diffusing particles. Preferably the light diffusing particles comprise a polymer selected from the group consisting of poly(methyl methacrylate).

The bottom diffuser film may be described by a polymer particle concentration $\rho$, a sheet material thickness, t, and a mean particle size, s, and achieving a preferred sheet material having optical properties of at least 70% transmission and at least 80% haze according to ASTM standard D 1003-00, a more preferred sheet material having optical properties of at least 90% transmission and at least 80% haze, and a most preferred sheet material having optical properties of at least 90% transmission and at least 90% haze, for a polymer such as a poly(acrylate), a poly(alkyl methacrylate) and the particles are suspended within a polycarbonate. However, it will be understood by those skilled in the art that the aforesaid particle concentration $\rho$, sheet material thickness, t, and mean particle size, s, can be manipulated either separately or in combination so as to achieve the preferred, more preferred and most preferred transmission and haze.

The top diffuser film is formed to preferably have a haze less than about 50%, with a high transmission of preferably greater than about 80% and most preferably greater than about 90%.

As outlined above one of the major performance needs of a diffuser film is dimensional stability during environmental testing. It is typical for conventional films to become warped or wrinkled after exposure to high temperatures and humidities. This leads to an optical waving effect that is evident by sinusoidal oscillations in luminance intensity across the display panel after exposure. This problem gets progressively worse for films of larger area in larger displays and for elevated environmental conditions. For larger displays like LCD TV there is a need for more and brighter florescent lamps hence exposing the BLM and display to higher temperatures. This instantly points to the need for a dimensionally stable film that has a high temperature resistance. There are many factors that can result in dimensional stability issues in the film during environmental exposure. The main root causes are low heat resistance, mismatched coefficient of thermal expansion, modulus, shrinkage, coefficient of hydroscopic expansion and residual stress. Embodiments of the current invention target improving all of these properties. Embodiments of the current invention utilize polycarbonate as the polymeric film substrate material instead of PET, which is the material of choice for many commercial LCD diffusers. Polycarbonate has a heat deflection temperature (HDT) of 135° C. as compared to approximately 70° C. for amorphous PET. The HDT is the temperature at which the material starts to bend or deflect. Comparing a temperature ramp experiment where the film temperature is ramped from −20° C. to 100° C. the current commercial PET films have an average modulus decrease in the order of 700 MPa whereas the polycarbonate films from embodiments of the current invention only sustain an average modulus decrease of 200 MPa. This results in superior dimensional stability performance and less optical effects due to the film wrinkling. Embodiments of the current invention use a process method that results in optically isotropic films. Hence there is less residual stress and opportunity for stress relaxation during thermal exposure.

Typically LCD diffuser films utilize a coating to create the diffusing power of the film. This is predominately a UV cured acrylic. The difference in the coefficient of thermal expansion, modulus, the hydroscopic expansion coefficient and thermal shrinkage between the PET and the coating material will induce a moment in the film causing curl, warpage and hence film wrinkling. This again will have the potential to induce the dimensional stability issues outlined above. Embodiments of the current invention utilize a texture or bulk additive hence resulting in a film with isotropic material properties. This will result in a film that has minimized mismatch in material properties and hence reduce the propensity to induce curvature and wrinkling. All of these design differences outlined above result in a film that has far superior dimensional stability performance during environmental reliability testing.

The present invention reduces static electricity attraction and film stickage during the film handling and conversion process as well as in the final display application. To alleviate these issues in the current design, an anti static additive is added to the polycarbonate resin which reduces the static generation on a film and dissipates static charge quickly before dust and film sticking can occur.

LCD panels are very sensitive to visible optical defects in the films of the panels that result in viewing imperfections. Film defects as small as 100-200 microns can result in a defective LCD panel. Hence, scratch and visible defects due to damage of the coating of these films may reduce the yields of acceptable films since the defects are very easy to detect due to the index and color difference between the UV coating and the base film. The embodiments described within do not need a coating system and hence generate superior yields through the whole BLM assembly process

EXAMPLES

The top protective diffusing film requires a very low light scattering power film. This is due to the fact that the luminance that the viewer detects is inversely proportional to the scattering power of the film. The description below outlines the product performance and method of manufacture of a top protective diffuser according to embodiments of the invention.

Example #1

Top Diffusing Film

A state of the art extrusion line (extruder, melt pump, film die, and calendaring roll stack) was used to produce a top protective diffuser product. A chrome plated steel calendaring roll was used, polished to less than 1 μin Ra (Ra is the surface roughness), and a silicone rubber backing roll was used. The polymer resin used was LEXAN EXRL0080-1111 (described in U.S. Pat. No. 6,194,497 to Henricus et al. and available from GE Plastics) with the FC-1 antistatic additive incorporated at a level of between 0.5 and 1.5 mass %.

Operating Conditions Included:

Barrel zone temperatures: 450-550° F.

Mass flow rate: 200-250 lbs/hr

Die zone temperatures: 520-530° F.

Die lip width: 68 inches

Calendaring roll setup:
    Roll Position 1: Textured (40 μin Ra nominal) Silicone 0.375 inch thick nominal, 70 Shore A durometer nominal.
    Roll Position 2: Polished (<2 μin Ra nominal) chromed steel
    Nip pressure: 30-200 psi (15-150 pli)

Film thickness: 0.005 inch

Chart 1 below outlines the performance of the resulting films:

CHART 1

| Ex. | Haze % | Stdev % | Trans % | Stdev % | C-x | C-y | D65-x | D65-y | A-x | A-y |
|---|---|---|---|---|---|---|---|---|---|---|
| 1A | 37.5 | 1.68 | 91.3 | 0.27 | 0.32165 | 0.325558 | 0.450833 | 0.4056 | 0.313342 | 0.330233 |
| 1B | 47.3 | 4.97 | 90.9 | 0.33 | 0.312858 | 0.328967 | 0.450683 | 0.4055 | 0.309692 | 0.318008 |
| 1C | 42.8 | 2.97 | 91.2 | 0.2 | 0.309833 | 0.318175 | 0.450792 | 0.405583 | 0.313275 | 0.330133 |

Chart 1 shows the percent haze and light transmission values for each of the films of example 1, where 1A-1C are produced at slightly different processing conditions, along with the standard deviation for these parameters. As can be seen, all the films 1A-1C have a haze less than 50%. All of the above films in Chart 1 exhibited the low haze that is needed for the low scattering top diffuser and at the same time a high transmission, which is preferably greater than 80%. Thus, for these films the Moire effects from the BEF films are reduced, with little impact on the optical performance, and while also having antistat performance. Chart 1 also lists the film CIE 1931 color coordinates, (C-x, C-y), (D65-x, D65-y), (A-x, A-y). The color coordinates are within a typical industry range for these types of films.

Point defect inspection was performed by visual inspection which included cutting the film into monitor sized sheets and viewing both transmitted then reflected light from a shielded fluorescent bulb in a darkened class 10,000 clean room.

Example #2

For Bottom Diffusing Film

The bottom diffusing film requires a very high light scattering power film. This is to hide features from the light guide and help make the light more uniform. The description below outlines the product performance and method of manufacture of a bottom diffuser.

A state of the art optical film extrusion line (extruder, melt pump, film die, and calendaring roll stack) was used to produce a bottom diffuser product. A chrome plated steel calendaring roll was used produced using a slow blast texturing process, and a silicone rubber backing roll was used. The polymer resin used was LEXAN EXRL0091-WH5A201X (available from GE Plastics) which has an optimal acrylic bulk scattering additive at a loading of approximately 3-5% and size of 3-7 microns. Again the FC-1 antistatic additive was incorporated at a level of between 0.5 and 1.5 mass %. The polymer particles enhance the diffusing power of the film in conjunction with the textured surfaces. Both surfaces of this film are textured with this product design so as to alleviate optical coupling at the film/light guide/BEF interfaces.

Operating Conditions Included:

Barrel zone temperatures: 450-550° F.

Mass flow rate: 300-400 lbs/hr

Die zone temperatures: 530-570° F.

Die lip width: 68 inches

Calendaring roll setup:
  Roll Position 1: Textured (40 μin Ra nominal) Silicone 0.375 inch thick nominal, 70 Shore A durometer
  Roll Position 2: Textured (105 μin Ra nominal) flash chromed steel
  Nip pressure: 30-200 psi (15-150 pli)

Film thickness: 0.005 inch

Chart 2 below outlines the performance of the resulting films:

CHART 2

| Ex. | Haze % | Stdev % | Trans % | Stdev % | C-x | C-y | D65-x | D65-y | A-x |
|---|---|---|---|---|---|---|---|---|---|
| 2A | 96.8 | 0.15 | 91.1 | 0.71 | 0.30969 | 0.31771 | 0.45076 | 0.40533 | 0.31314 |
| 2B | 94.3 | 0.33 | 90.6 | 0.49 | 0.30953 | 0.31751 | 0.45063 | 0.40523 | 0.31298 |
| 2C | 99.1 | 0.17 | 91.1 | 0.55 | 0.31071 | 0.31834 | 0.45163 | 0.40565 | 0.31413 |
| 2D | 93.4 | 0.42 | 87.3 | 0.88 | 0.31133 | 0.31904 | 0.45223 | 0.40564 | 0.31473 |
| 2E | 99.3 | 0.12 | 91 | 0.42 | 0.31040 | 0.31834 | 0.45138 | 0.40551 | 0.31385 |
| 2F | 99.5 | 0.12 | 77.8 | 1.11 | 0.31723 | 0.32393 | 0.45752 | 0.40680 | 0.32063 |

Chart 2 shows the percent haze and light transmission values for each of the films of example 2, 2A-2F, where 2A-2F have slightly different formulations within the scope of the embodiments within, the standard deviation for these parameters, and lists the film CIE 1931 color coordinates in a similar fashion to Chart 1. All of the above films in Chart 2 exhibited the high haze that is needed for the high scattering bottom diffuser and at the same time a high transmission. Thus these films in chart 2 had the optical properties of a film with a haze at a high enough level to provide the hiding properties that are needed, while at the same time the transmission is high so that optical performance is not effected. Preferably the transmission is greater than 80% The point defect inspection used the same method described in the previous example.

A flaw free calendaring roll is important for the quality of films in examples #1 and #2 above. As an example of a calendaring roll, a 20" diameter steel roll with an effective 59 inch wide face can be produced using one of two processes. 1) Grit Blasting and 2) Electron Discharge Texturing (EDT). Grit Blasting can produce flaw free rolls if the Grit pressure is nominally 35 psi and a metallurgy of 58CrMoV4 is used. Electron Discharge Texturing (EDT) may also produce flaw free rolls. Preferably the grit blasting is less than 50 psi. Preferably the Grit Blasting uses 60 to 120 grit Aluminum Oxide.

Diffusion films with antistatic properties: comparative example #1 and examples #3 to #6.

Typical formulations as presented in Table 2 were compounded in a single screw extruder, pelletized and formed into 5 mil films on an optical film extrusion line by the same process described above.

TABLE 2

Example of diffuser resin formulation

| Raw material | Weight, Kg |
|---|---|
| Lexan 100 grade powder | 100 |
| Mold release | 0.145 |
| Heat Stabilizer | 0.095 |
| Antistatic additive (FC1) | 0.75, 1.00 |
| PMMA microbeads | 0, 4.2 |
| Color package | 0.27 |
| UVA | 0.15 |

Examples of antistatic performance for both top diffuser and bottom diffuser at different levels of antistatic additive FC1 are presented in Table 3 below.

TABLE 3

Antistatic performance of diffuser films

| Sample | PMMA, phr | FC1, phr | Surface resistivity, ohm/sq | Static decay, s |
|---|---|---|---|---|
| Comparative #1 | 0 | 0 | 1.56E+17 | infinity |
| Examples #3 | 0 | 0.75 | 2.79E+13 | 39 |
| Examples #4 | 0 | 1 | 1.33E+13 | 16 |
| Examples #5 | 4.2 | 0.75 | 4.64E+13 | 55 |
| Examples #6 | 4.2 | 1 | 2.58E+13 | 20 |

The surface resistivity was measured according to ASTM D-257 using a Keithley 6517A Electrometer @ 23° C. and 55% RH. The static decay was measured according to JIS 1094-1980 using a Static Honestmeter (Type: S-5109), Shishido Electrostatic Ltd., @ 23° C. and 55% RH.

Table 3 illustrates antistatic properties such as surface resistivity (SR) and static decay (SD) for various examples. The lower the SR and SD the less static charge is built up on film surface and therefore films will be less sticky and will attract less dust. The beneficial effect of FC1 to the antistatic performance of the film is demonstrated by the drastic reductions in both SR and SD as shown in table 3.

Protective Film

In some embodiments there is contemplated the use of a protective film, or masking, to protect the light diffusing film from damage during shipment, slitting, die cutting, or other aspects of process handling prior to final use in a backlight display. This masking comprises of a backing material and a pressure sensitive adhesive. The material and lamination process may be optimized to ensure that the masking stays adhered during shipment and conversion but yet can be easily removed by the assembler during insertion into the backlight display device.

Figure 9:
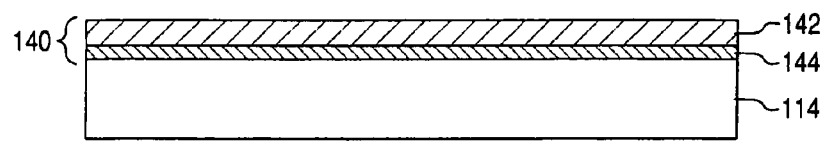
FIG. 9 is a side cross sectional view of an optical structure including a diffusing film and a protective film according to an embodiment of the invention.

As shown in FIG. 9, to protect against scratches, dust, and other damage to the film during shipment and conversion from an extruded film to an LCD panel film, the protective film 140 can be laminated to the diffuser film 114. This protective film 140 or masking can be composed of a backing film 142 such as polyethylene or polypropylene and a pressure sensitive adhesive 144. The mechanical properties of the backing film 142 are important to ensure that the protective film 140, which may be 10 to 30% of the final lamination thickness (the sum of the thicknesses of the protective film 140 and the diffuser film 114), does not warp the final product through relaxation of stresses imparted in the lamination process. The pressure sensitive adhesive (PSA) must be designed to allow it to flow adequately into the texture of the diffuser film such that microscopic air pockets that are trapped in the valleys of the diffuser film texture are not allowed to migrate and form macroscopic air bubbles that can cause premature delamination of or potential damage to the diffuser film. The PSA may be for example, a pressure sensitive adhesive designed to have the necessary peel force. The lamination nip is also important in the lamination quality. A polymeric roll of silicone or other durable rubber allows the nip force to be distributed over a wider "foot-print." This distribution of the force allows time for the PSA to flow into the diffuser film texture and prevent defects as described above.

Example #7

Example #7 is an assembly for an optical film, which is formed with low stress using a protective masking in addition to controlled diffusion as in the products above.

A state of the art optical film extrusion line (extruder, melt pump, film die, and calendaring roll stack) was used to produce a top diffuser product with a protective film. A chrome plated steel calendaring roll was used produced using electron discharge texturing or aluminum oxide grit blasting, and a silicone rubber backing roll was used. The polymer resin used was a polycarbonate homopolymer resin with minor levels of colorants, heat stabilizer, and an ester type release agent. The polymer resin was compounded using a 30 micron melt filter to remove contaminants.

Operating Conditions Included:

Barrel zone temperatures: 450-550° F.

Mass flow rate: 200-250 lbs/hr

Die zone temperatures: 520-530° F.

Die lip width: 68 inches

Calendaring roll setup:
 Roll Position 1: Textured (40 μin Ra nominal) Silicone 0.375 inch thick nominal, 70 Shore A durometer nominal.
 Roll Position 2: Textured (105 μin Ra nominal) flash chromed steel
 Nip pressure: 30-200 psi (15-150 pli)
 Film thickness: 0.005 inch
 Masking: Optical quality polyolephin masking and pressure sensitive adhesive designed to have the necessary peel force
 Masking Nip rolls: 8" diameter, 1.5" thick EPDM, durometer of 70 Shore A
 Lamination pressure: nominally 25 pli.

Figure 10:
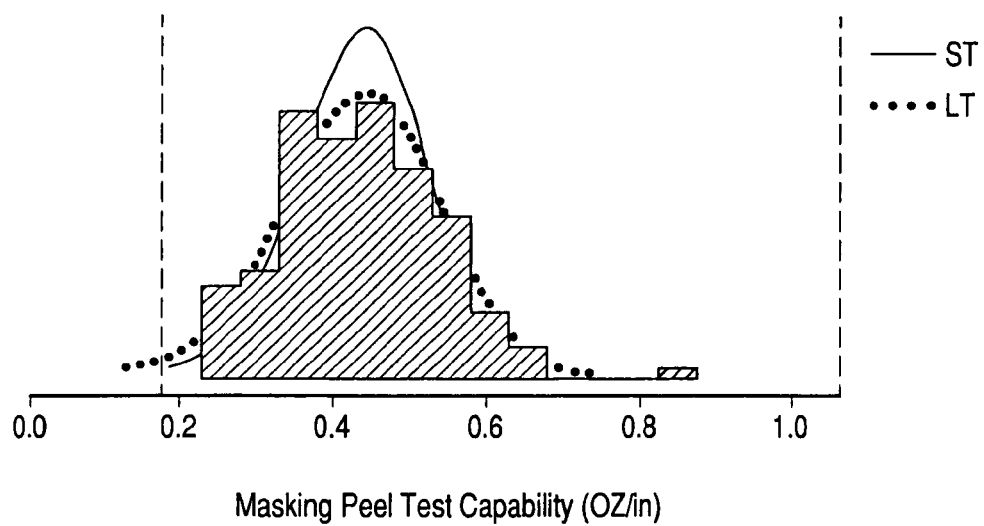
FIGS. 10-13 are graphs illustrating respective performance parameters of diffusion films formed using protective films according to an embodiment of the invention, where the performance parameters are general to other embodiments.

FIGS. 10-13 illustrate the performance of the diffusion film products formed using the protective film, but is indicative of the performance of all the embodiments described within. FIG. 10 is a histogram showing the masking peel test capability for 152 samples. The peel test capability easily fell within the desired range of 0.17 and 1.06 oz./inch. The short term (ST) (within a lot) distribution and long term (LT) (over multiple lots) distribution is also shown.

Figure 11:
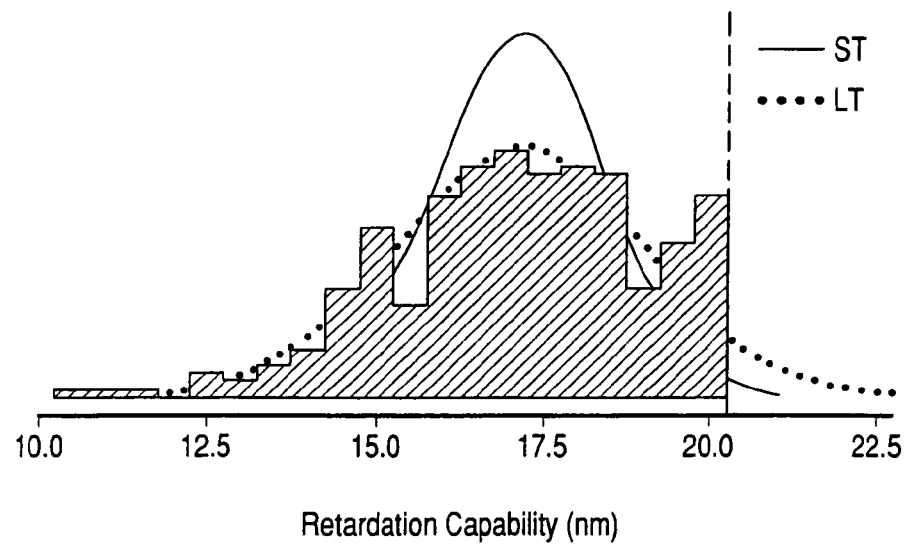

FIG. 11 is a histogram showing the retardation capability for 302 samples. In forming the film stresses tend to allow some amount of alignment of the polymer molecules in a preferred direction within the plane of the film. The speed of light for light perpendicularly incident upon the film will be different for light polarized along the same direction as the preferred direction as compared to light polarized along the direction perpendicular to the preferred direction. The retardation is the lag distance due to this difference in light speed between light beams having these respective polarizations for film. The retardation capability was below 21 nm for all samples. The short term (ST) (within a lot) distribution and long term (LT) (over multiple lots) distribution is also shown.

Figure 12:
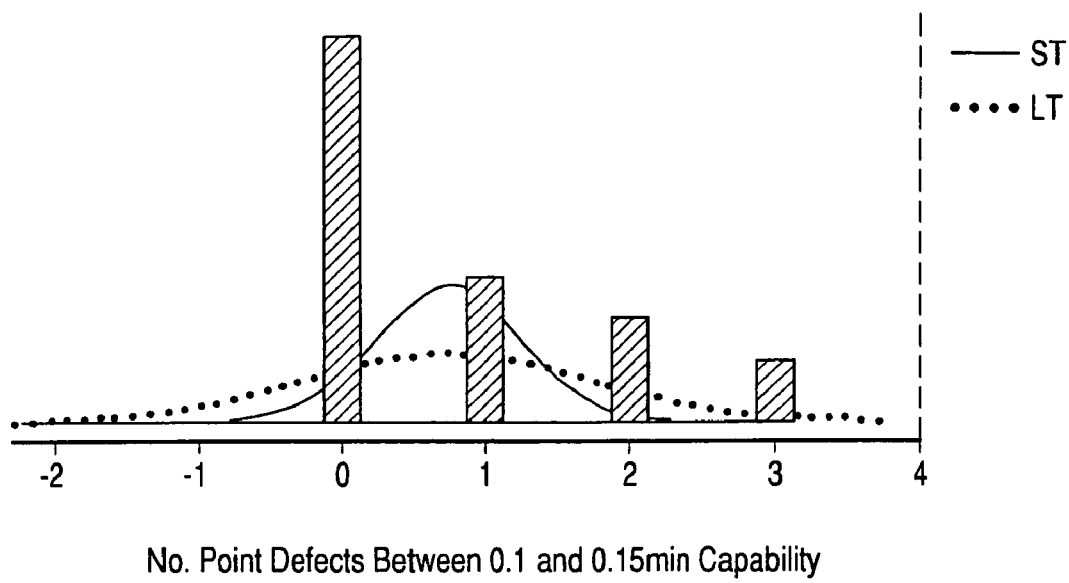

FIG. 12 illustrates a histogram for the number of point defects with a size between 0.1 and 0.15 mm over a 10 square foot film for 48 samples. The point defect size is a characteristic length of the defect. The number of these point defects was three or less for all samples. The short term (ST) (within a lot) distribution and long term (LT) (over multiple lots) distribution is also shown.

Figure 13:
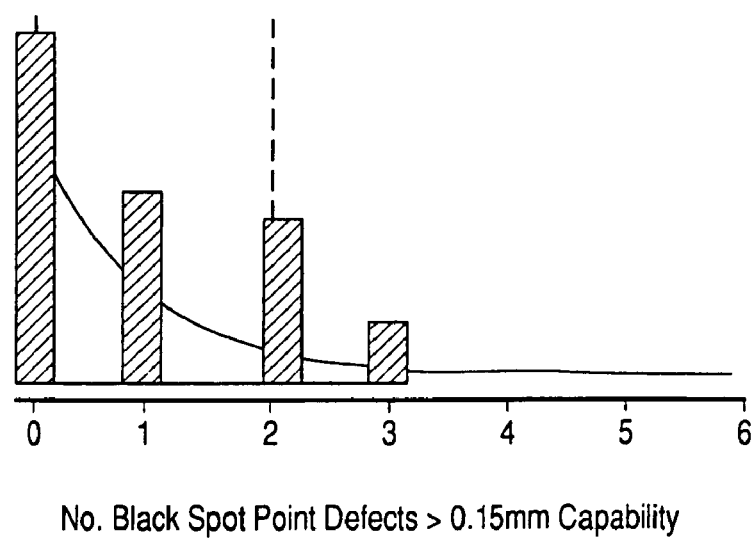

FIG. 13 illustrates a histogram for the number of black spot point defects with a size larger than 0.15 mm over a 40 square foot film for 28 samples. A black spot point defect is due to burnt polycarbonate. The number of these black point defects was three or less for all samples, with only a few samples having three defects. The short term (ST) (within a lot) distribution and long term (LT) (over multiple lots) distribution is also shown.

UV Absorber

Typically the spectral power distribution of the light sources used in backlit displays have some peaks in the ultraviolet (UV) range of the spectrum (below about 400 nm). For example, most cold cathode fluorescent lamps (CCFL) emit some energy at the 313 and 365 nm mercury lines as well as a weak continuum in the near UV. Aromatic polycarbonates are particularly sensitive to wavelengths smaller than 350 nm. To avoid degradation and discoloration of the films used in backlit displays one has to protect the polycarbonate from the UV light. For transparent films the protection should not be done at the expense of the transmission of visible light.

More than one technique may be used for protecting clear articles. These techniques include applying coatings made of UV stable materials, and adding additives in bulk, such as UV absorbers (UVA), quenchers or antioxidants. For thin parts adding UV absorbers in the bulk is a very efficient approach. In a preferred embodiment of this invention the diffusion optical film may contain from 0.01 to 1% by weight of a UVA component, preferably between 0.05 to 5%. To avoid evaporation through the large surface area of the film during processing operations, the UVA preferably has low volatility, with 10% weight loss temperature preferably above 240° C., more preferably above 300° C., and most preferably above 350° C. To reduce the impact on the luminance the UVA should have minimum absorption in the visible range of the spectrum, preferably with a cut off wavelength less than 400 nm, more preferably less than 380 nm. The UVA is preferably selected from the group consisting of hydroxybenzophenones, hydroxyphenyl benzotriazoles, cyanoacrylates, oxanilides, hydroxyphenyl triazines and benzoxazinones. More preferably the UVA is selected from the group consisting of hydroxyphenyl benzotriazoles and benzoxazinones, with very little optical absorbance in the visible and little yellow color.

Figure 6:
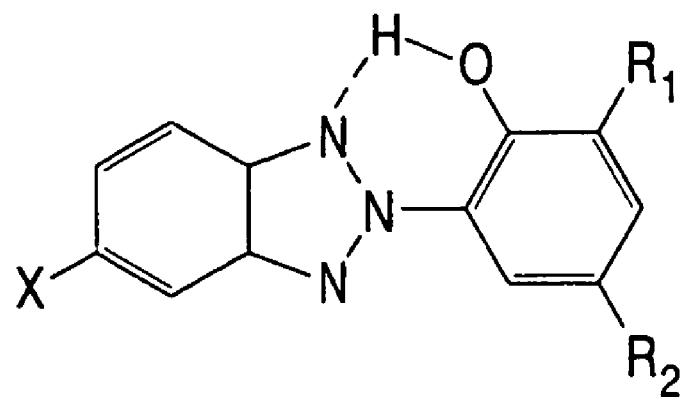
FIGS. 6 and 7 illustrates a benzotriazole ultraviolet absorber structure.
Figure 7:
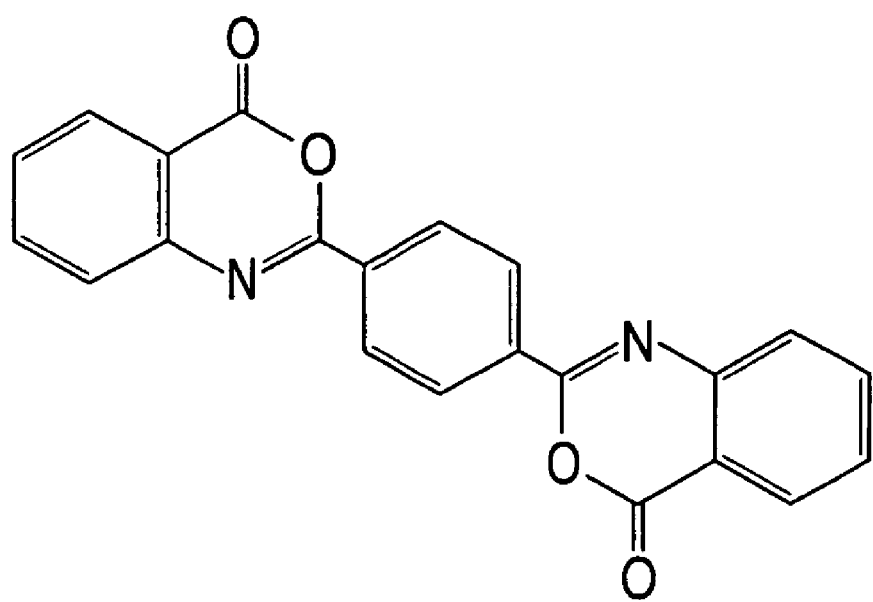

The preferred benzotriazole UVAs can be derivatives of the structures illustrated in FIG. 6.

Non-restrictive examples for the substituents X, R1 and R2 are:

X=H, Cl,

R1=tert-butyl, $CH_2$ (dimmer), sec-butyl, cumyl, t-amyl, $C_{12}H_{25}$, 4,5,6,7-tetrahydro-isoindole-1,3-dione, and R2=methyl, cumyl, tert-butyl, tert-amyl, tert-octyl, —$CH_2$—$CH_2$—$COOC_8H_{17}$, —$CH_2$—$CH_2$—COO—($CH_2$—$CH_2$—O)$_8$—H, —$CH_2$—$CH_2$—OH, —($CH_2$—$CH_2$—COO—$CH_2$—$CH_2$)$_2$—, bisphenol A, 4-octyloxy-3-methylphenyl)(phenyl)methanone, ethyl 2-methylacrylate, acetaldehyde, ethylene, polystyrene.

Examples of commercially available benzotriazole, suitable for use as a component of the UVA, include Cyasorb 5411 from Cytec, Tinuvin 234 or Tinuvin 236 from Ciba.

The preferred benzoxazinones UVA structure can be a mono, bis or tris benzoxazinones.

Non-restrictive examples of benzoxazinones include 2,2'-bis(3,1-benzoxazin-4-one), 2,2'-ethylenebis(3,1-benzoxazin-4-one), 2,2'-tetramethylenebis(3,1-benzoxazin-4-one), 2,2'-hexamethylenebis(3,1-benzoxazin-4-one), 2,2'-decamethylenebis(3,1-benzoxazin-4-one), 2,2'-p-phenylenebis(3,1-benzoxazin-4-one), 2,2'-m-phenylenebis(3,1-benzoxazin-4-one), 2,2'-(4,4'-diphenylene)bis(3,1-benzoxazin-4-one), 2,2'-(2,6- or 1,5-naphthalene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one), 2,2'-(2-chloro-p-phenylene)bis(3,1-benzoxazin-4-one), 2,2'-(1,4-cyclohexylene)bis(3,1-benzoxazin-4-one).

A commercially available benzoxazinones UVA that is suitable for use in the present invention, is sold under the trade name Cyasorb 3638 from Cytec Industries.

Diffusion Films with UVA Properties

Comparative Example #2 and Examples #8 to #13

The formulation described in comparative example #2 and examples #8 to #13 are based on the typical formulation presented in Table 1. The same processes described for examples #3 to #6 were used for compounding and film extrusion of comparative example #2 and examples #8 to #13.

TABLE 4

UVA performance of diffuser films

| Sample | PMMA (phr) | FC1 (phr) | Cyasorb 3638 (phr) | Cyasorb 5411 (phr) | Tinuvin 294 (phr) | Film yellowness index | Color shift on abusive molding dy | Color shift after UV exposure dx | Color shift after UV exposure dy |
|---|---|---|---|---|---|---|---|---|---|
| Comparative 2 | 4.2 | 0.75 | 0 | 0 | 0 | 9.93 | 0.0022 | 0.0007 | 0.0011 |
| Example 8 | 4.2 | 0.75 | 0.12 | 0 | 0 | 9.86 | 0.0020 | 0.0002 | 0.0004 |
| Example 9 | 4.2 | 0.75 | 0.15 | 0 | 0 | — | — | 0.0002 | 0.0002 |
| Example 10 | 4.2 | 0.75 | 0 | 0.07 | 0 | 9.99 | — | 0.0003 | 0.0005 |
| Example 11 | 4.2 | 0.75 | 0 | 0.12 | 0 | 10.03 | 0.0035 | 0.0002 | 0.0002 |
| Example 12 | 4.2 | 0.75 | 0 | 0.2 | 0 | 10.07 | — | 0.0001 | 0.0002 |
| Example 13 | 4.2 | 0.75 | 0 | 0 | 0.12 | 10.7 | 0.0040 | 0.0000 | 0.0001 |

The color stability of the resin was determined both in terms of the color shift on abusive molding and the shift after UV exposure. The color shift on abusive molding was measured as color after abusive injection molding (5 minutes dwell time) minus the color after normal molding (30 seconds dwell time). The abusive molding, in this case, differs from the normal molding by the long cycle time (the time the material spends in the extrusion barrel under high heat, i.e., at ~600° F. The molding was performed at 600° F. The color shift after UV exposure is the color after UV exposure minus the color before UV exposure. The color shift after UV exposure was performed in an accelerated fashion for 200 hours using an accelerated test lamp providing 20 Klux of cool white fluorescent light according to ASTM D4674 method 3. For both the color shift on abusive molding and the color shift after UV exposure, the x and y are chromaticity coordinates according to CIE 1931. The values dx and dy are the shift in those color coordinates. The color shift was measured in reflectance mode using a D65 illuminant and an observer angle of 10°.

In the flat panel LCD industry, specifications often require that the initial color of the display be within +/−0.003 of a target color. Transfer functions show that this corresponds to a range of dx and dy of +/−0.0007 in a bottom diffuser film. The color of the film can be affected by the polymer degradation that can be induced by the small amount of UV light coming out from a CCFL lamp, when that type of lamp is used as light source. Table 4 above illustrates that while in a non-stabilized formulation (without the UVA) color shift after weathering (shown as color shift after UV exposure) is larger than the typical specifications for the initial color, all the UV stabilized formulations show very good color stability, the shift being significantly smaller than the typical specifications.

The ratio between the amount of UV light provided by the accelerated test lamp (20 Klux of cool white fluorescent) and the CCFL lamp (having a high end brightness of 40,000 candela/sq.ft.) is roughly about 250 to 1. Thus, the 200 h of accelerated test should correspond to about 50,000 h in a single lamp LCD, which is at the high end for the amount of powered on time for which the LCD industry typically builds its specifications. The accelerated weathering data in table 4 demonstrate that the UV stabilized films should have a low color shift during use in CCFL based LCDs.

Table 4 also illustrates that the UVAs used add very little yellow color to the diffuser films as it can be seen from the column with yellowness index (YI) data. The YI is calculated from spectrophotometric data that describes the change in color of a test sample from clear or white toward yellow and is determined according to ASTM E313. Example 8 (with 0.12% benzoxazinone UVA, Cyasorb 3638), demonstrated the smallest YI. Preferably the addition of the UVA component induces a change in yellowness index in the film, $\Delta YI<1$, and most preferably $\Delta YI<0.1$ In addition to low initial yellowness, it is important that the resin color is as stable as possible during thermal processing. Some UV stabilizers, such as benzotriazoles can sometimes have a negative impact on the thermal stability of polycarbonate formulation due to their reactivity towards the polymer. In table 4, formulations with Cyasorb 3638 provided the best color stability during molding (as demonstrated by the color shift on abusive molding values).

Reduced Defect Films

To ensure that the final film is free from point defects, especially those caused by defects in the calendaring rolls, it is important to have an adequate inspection technique to ensure that the film, and thus the rolls, are defect free. Several techniques can be employed but important components of the film inspection include procedures and devices to ensure thorough spatial coverage of the inspection area (so no area is inadvertently skipped), the coverage of multiple inspection angles, and adequate time for the inspector to assess potential point defects relative to the base texture of the film.

One specific source of point defects in the films comes from degraded polymer in the raw material used in the production of the film. This is manifested in the form of opaque or translucent specks (hereafter referred to as black specs) in the final film. These type of defects are very easily visible to the human eye, and any defects larger than 100 microns in a diffuser film can render it unusable. As described below, the number of such defects may be minimized by using a resin that was manufactured by passing it through a melt filter prior to pelletization.

Both top and bottom diffuser films are susceptible to having black specks caused by degraded polymer in the raw material. These black specks are undesirable. The below describes a method of manufacture of diffuser films with a reduced number of defects through filtering the resin material used as the film material.

An optical film extrusion line (extruder, melt pump, film die, and calendaring roll stack) was used to produce a bottom diffuser film. Two resins were used: Polymer resin A was grade EXRL0091-WH5A201X (available from GE Plastics). For polymer resin A, the resin components are passed through a 70 micron melt filter made up of porous discs prior to pelletization. Resin B has an identical composition to Resin A with the exception that only a 300 mesh screen filter was used prior to pelletization.

Operating Conditions for Making the Films Included

Barrel zone temperatures: 450-550° F.

Mass flow rate: 200-400 lbs/hr

Die zone temperatures: 520-570° F.

Die lip width: 54 inches

Calendaring roll setup:
 Roll Position 1: Textured (40 μin Ra nominal) Silicone 0.375 inch thick nominal, 70 Shore A durometer
 Roll Position 2: Textured (105 μin Ra nominal) flash chromed steel
 Nip pressure: 30-200 psi (15-150 pli)

Film thickness of 0.005 inch

Films were made using both Resin A and Resin B by the above process. In both cases, the extrusion line was run for five hours after introduction of the resin prior to take samples for evaluation to ensure that steady state performance had been reached.

To evaluate the films, 32 samples of films made from Resin A and 32 sample made from Resin B, each suitable for use in a 17" diagonal backlight module, were cut from a contiguous film 43.3 inches in width. Each sample was then inspected under florescent light in a darkened class 10000 cleanroom environment. Any black speck observed during this inspection process was sized using an eye loupe (a hand held magnifying device that has a length measuring scale attached to its end marked in 50 micron increments). The size being reported was taken as the arithmetic average of the speck's length along the longest dimension and the direction perpendicular to the longest dimension. Any film having one or more black specs 150 microns in size or larger was rejected. The results obtained are outlined below:

TABLE #5

| | Resin Filtering | |
|---|---|---|
| Resin | Samples rejected | Yield (%) |
| A | 2 | 93.8 |
| B | 5 | 84.4 |

In Table #5 above, the yield is calculated by using the formula: Yield (%)=(1−number of rejected films/32)*100. As can be seen samples made with Resin A had a higher yield than those made with Resin B, and the yield for Resin A was above 90%.

Reduced Waving in Films

Although polycarbonate films having a texture or bulk additive offer superior performance in environmental reliability testing, they may be subject to a phenomenon termed as "short-term waving." This phenomenon is manifested in the form of one or more waves in the portion of the diffuser film closest to the florescent lamp when the diffuser film is part of a display with a fluorescent lamp light source. Short-term waving occurs due to the differentially higher thermal expansion of the portion of the diffuser film closest to the lamp in relation to those portions situated further from the lamp. The differential expansion results in a buckling of the hotter portion of the film located close to the lamp. When the diffuser film is part of an LCD display, this waviness is sometimes visible through the panel and is undesirable from a visual standpoint. This phenomenon does not result in permanent deformation of the film, as the film reverts to its original shape once it is cooled to ambient temperature either by removing it from the backlight module, or by turning the lamp off and then waiting for the system to cool down. Short-term waving is of particular concern in top diffuser films as location of these films on the top of the stack makes the waviness more readily visible. As described later, this phenomenon may be minimized by utilizing a film of larger thickness. This results in a stiffer film which is more resistant to waving.

Short-term waving is undesirable, particularly in top diffuser films. The example below demonstrates how using a thicker film can significantly improve the short term waving performance in the application.

An optical film extrusion line (extruder, melt pump, film die, and calendaring roll stack) was used to produce a top diffuser product. Polycarbonate resin grade EXRL0080-1111 (available from GE Plastics) was used.

Operating Conditions for Making the Films Included

Barrel zone temperatures: 450-550° F.

Mass flow rate: 150-300 lbs/hr

Die zone temperatures: 500-570° F.

Die lip width: 54 inches

Calendaring roll setup:
  Roll Position 1: Textured (40 μin Ra nominal) Silicone 0.375 inch thick nominal, 70 Shore A durometer
  Roll Position 2: Textured (105 μin Ra nominal) flash chromed steel
  Nip pressure: 30-200 psi (15-150 pli)
  Films of thickness 0.005 inch and 0.008 inch were made.

From the films of each thickness produced, 10 samples, each suitable for use in a 17" diagonal backlight were cut. These samples were suitable as top diffusers in a 17" backlight and inspected for short term waving behavior with the panel of the display in place and a florescent lamp turned on. The number of waves visible through the panel are counted and classified into one of the following four categories, listed in order of worsening degree of waving OK: No visible waving at any view angle.

Limit OK: No dark shadows apparent due to waving, and fewer than three waves visible at view angles between 45 and 90 degrees, as measured from the horizontal surface where the module is placed.

Limit NG: Any of the above criteria are violated at view angles between 45 and 90 degrees.

NG: Visible waving at 45 degrees.

The results obtained are listed below:

TABLE 6

Thickness Effects

| Thickness | Response | | | |
|---|---|---|---|---|
|  | OK | Limit OK | Limit NG | NG |
| 0.008" | 10 | 0 | 0 | 0 |
| 0.005" | 0 | 1 | 3 | 6 |

As can be seen from the results, the 0.008" thick films exhibited a superior waving performance as compared to the 0.005" thick films.

Scratch Resistance

Uncoated diffuser films with a textured surface may provide superior resistance to scratching during handling. This can be quantified using a Taber abrasion test.

Taber testing was performed as follows. Top diffuser films of 0.008" nominal thickness were produced using the process described in the above section regarding reduced waving in films. Three 3 inch diameter rounds, with a 0.25" diameter center hole were cut from the film. The samples were labeled GET#1, GET#2, and GET#3. As comparative examples, similar samples were cut from D117 top diffuser film, which is produced by coating a light diffusing layer on a polyethylene terephthalate base film. These samples were labeled D117#1, D117#2, and D117#3. 100 rounds of Taber testing was performed on each sample using a 5130 Abraser. In this test, the sample is mounted on a round rotating table, with the top surface in contact with two Calibrase CS-10F wheels (these form standard abrasive surfaces). The table is rotated for a preset number of turns so that the sample rubs against the wheels, causing the surface to abrade. The weight loss of the samples is reported in the table below.

TABLE 7

Taber testing

| Sample ID | Rounds | Initial Wgt. (gms) | Tested Wgt. (gms) | Weight Loss (gms) |
|---|---|---|---|---|
| GET#1 | 100 | 1.9927 | 1.9929 | −0.0002 |
| GET#2 | 100 | 1.9483 | 1.9477 | 0.0006 |
| GET#3 | 100 | 1.9314 | 1.9298 | 0.0016 |
| D117 #1 | 100 | 1.5933 | 1.591 | 0.0023 |
| D117 #2 | 100 | 1.5841 | 1.5819 | 0.0022 |
| D117 #3 | 100 | 1.5885 | 1.586 | 0.0025 |

The GET#1, GET#2, and GET#3 films exhibited lower weight loss than the comparative samples, and thus had improved scratch resistance as compared to the D117#1, D117#2, and D117#3 samples. The GET #1, GET#2 and GET #3 samples all exhibited a weight loss per surface area of less than about $4.0 \times 10^{-5}$ gms/cm$^2$.

Reducing Gauge Banding

Another cosmetic defect of the film relates to the process of winding the film. During the production of the film, small variations in the thickness occur across the width, with some spots being thicker than others. During the process of winding the film, the thicker spots accumulate on top of each other, resulting in a roll which has a bumpy surface. This phenomenon is known as "gauge banding." The effect is particularly pronounced when the film is wound at too high a tension, as in this case, the film can undergo permanent deformation around the thick spots. The deformation shows up as stretch marks and renders those portions of the film unusable. As described later, this phenomenon may be avoided by winding the film at low tension, or oscillating the film prior to winding, so that the thicker spots are distributed and do not line up on top of each other.

Stretch marks from gauge banding can result in a cosmetically unacceptable film. The below examples show how this effect can be avoided by winding at a lower tension, or by oscillating the web during the calendaring process.

An optical film extrusion line (extruder, melt pump, film die, and calendaring roll stack) was used to produce a diffuser film. Polycarbonate resin grade ML9736-1111 (available from GE Plastics) was used.

Operating Conditions for Making the Films Included

Barrel zone temperatures: 450-550° F.

Mass flow rate: 150-300 lbs/hr

Die zone temperatures: 500-570° F.

Die lip width: 54 inches

Calendaring roll setup:
  Roll Position 1: Textured (40 μin Ra nominal) Silicone 0.375 inch thick nominal, 70 Shore A durometer
  Roll Position 2: Textured (105 μin Ra nominal) flash chromed steel
  Nip pressure: 30-200 psi (15-150 pli)
  Film of thickness 0.005 inch and 43.3" width was made.

Rolls of 1000 foot length were made at different winding tensions and different web oscillation speeds and amplitudes. Final rolls were assessed visually for gauge banding performance, with a "PASS" qualification if no visible gauge bands and "FAIL" if the roll showed visual gauge bands. The performance is noted below, and the web oscillator amplitude is reported as a peak to peak value.

TABLE 8

| Web Tension (lbf/in web) | Web oscillator speed (in/min) | Web oscillator amplitude (in) | Gauge Bands |
|---|---|---|---|
| 0.46 | 0 | 0 | FAIL |
| 0.18 | 0 | 0 | PASS |
| 0.46 | 0.2 to 1.0 | 0.2 to 1.5 | PASS |

Film Flatness, Edge Curl and Bagginess Tests

Diffuser films typically need to meet strict flatness, edge curl and bagginess specifications to enable uniform optical and mechanical performance in the applications such as back light module applications. Films that depart from a planar orientation can have significant impact on the uniformity of the brightness leading to cosmetic performance issues. Test methods for these key flatness measures are outlined below:

Flatness: A sample of film from the roll at full web width is taken and cut to a sample size, such as 2 feet in length. The sample is placed on a smooth flat surface. A rule having a fine scale, such as a 1/100" scale is used to measure the largest visible distance between the smooth flat surface that the film is placed on and the lower edge of the film in the cut cross web direction. The measurement is repeated with the film flipped to the opposing side. Preferable film flatness parameters are less than 0.25 inches, more preferably less than 0.1 inches and most preferably less than 0.01 inches.

Edge Curl: A sample of film from the roll at full web width is taken and cut to a sample size, such as 2 feet in length. The sample is placed on a smooth flat surface. A rule having a fine scale, such as a 1/100" scale is used to measure the largest visible distance between the smooth flat surface that the film is placed on and the lower edge of the film in the down web/machine direction. Typically the edge curl phenomena is observed as a wavy undulation along the edge of the film. The measurement is repeated with the film flipped to the opposing side. Preferable film edge curl parameters are less than 0.1 inches, more preferably less than of 0.08 inches and most preferably less than 0.06 inches.

Bagginess: A sample of film from the roll at full web width is taken and cut to a sample size, such as 2 feet in length. The sample is placed on a smooth flat surface and trapped air pockets are smoothed out as much as possible. A bar jig machined with a known gap from jig ends to jig center is placed on the film surface. This procedure is repeated with jigs of various heights until the film touches the jig center and the height of the jig is then recorded. Multiple portions of the film surface are tested. The measurement is repeated with the film flipped to the opposing side. Preferable film bagginess parameters are less than 0.1 inches, more preferably less than 0.05 inches and most preferably less than 0.03 inches.

In typical configurations, a display such as shown in FIG. 3, has the bottom diffuser stacked on top of the light guide. If both the top of the light guide and the bottom of the bottom diffuser have a smooth surface, then intimate contact between the two surfaces can cause optical coupling effects leading to Moire patterns and unacceptable cosmetic performance. To avoid this effect the bottom surface of the bottom diffuser may have a surface texture that creates an uneven air gap between the smooth light guide plate and the bottom diffuser hence eliminating the optical coupling. It is preferable to have a film with a surface Ra greater than 0.5 microns, more preferably greater than 0.6 microns and most preferably to have a film with a surface Ra of 0.7 microns. The Ra is a measure of the average roughness of the film. It can be determined by integrating the absolute value of the difference between the surface height and the average height and dividing by the measurement length for a one dimensional surface profile, or the measurement area for a two dimensional surface profile.

While the invention has been described with reference to several embodiments thereof, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A light diffusing film for a back light display comprising:
a unitary film consisting essentially of polycarbonate and a uniformly dispersed anti-static material comprising a fluorinated phosphonium sulfonate in an amount sufficient to impart anti-static properties to the film, the surface resistivity of the film being below about $10^{15}$ ohm/square.

2. A light diffusing film comprising:
a polycarbonate material; and
an ultraviolet absorber (UVA) component in an effective amount to reduce discoloration of the film when exposed to ultraviolet (UV) light, wherein the color shift of the film after 200 hours of accelerated weathering according to the ASTM D4674 method 3 is dx<0.0005 and dy<0.0005, where dx is the shift in the x chromaticity coordinate and dy is the shift in the y chromaticity coordinate according to CIE 1931, and wherein the color shift is measured in reflectance mode using a D65 illuminant and an observer angle of 10°.

3. A light diffusing film comprising:
a polycarbonate material; and
an ultraviolet absorber (UVA) component in an effective amount to reduce discoloration of the film when exposed to ultraviolet (UV) light, wherein the color shift after 50,000 hours operational use in a single lamp LCD is dx<0.0005 and dy<0.0005, where dx is the shift in the x chromaticity coordinate and dy is the shift in the y chromaticity coordinate according to CIE 1931.

4. The light diffusing film as set forth in claim 3, wherein a color shift of a resin material of the film after five minutes at 600° F. is dy<0.0040, where dy is the shift in the y chromaticity coordinate according to CIE 1931.

5. The light diffusing film as set forth in claim 3, wherein a color shift of a resin material of the film after five minutes at 600° F. is dy<0.0020, where dy is the shift in the y chromaticity coordinate according to CIE 1931.

6. The light diffusing film as set forth in claim 3, wherein the addition of the UVA component induces a change in yellowness index (YI) in the film, ΔYI<1.

7. The light diffusing film as set forth in claim 3, wherein the addition of the UVA component induces a change in yellowness index (YI) in the film, ΔYI<0.1.

* * * * *